United States Patent [19]

Dijkmeijer et al.

[11] Patent Number: 4,669,599
[45] Date of Patent: Jun. 2, 1987

[54] APPARATUS AND METHOD FOR HANDLING A WORKPIECE

[75] Inventors: H. E. Dijkmeijer, Kropwolde; Ireneus J. T. M. Pas, Rozendaal, both of Netherlands

[73] Assignee: Advanced Semiconductor Materials Fico Tooling, B.V., Netherlands

[21] Appl. No.: 704,652

[22] Filed: Feb. 22, 1985

[51] Int. Cl.4 ............................................. B65G 47/24
[52] U.S. Cl. ..................................... 198/394; 198/399
[58] Field of Search ............ 198/394, 395, 379, 463.6, 198/345, 341, 399, 401, 751, 534

[56] References Cited

U.S. PATENT DOCUMENTS

| | | | |
|---|---|---|---|
| 2,664,992 | 1/1954 | Bahney | 198/401 |
| 2,734,619 | 2/1956 | Labombarde | 198/395 |
| 2,845,164 | 7/1958 | Stahl | 198/394 |
| 3,236,374 | 2/1966 | Zimmerman et al. | 198/395 |
| 3,251,452 | 5/1966 | Conway et al. | 198/534 |
| 3,673,954 | 7/1972 | Lala | 198/379 |
| 3,848,742 | 11/1974 | Krenmayr | 198/379 |
| 3,871,511 | 3/1975 | Wentz et al. | 198/463.6 |
| 3,973,485 | 8/1976 | Kajimoto et al. | 198/341 |
| 4,257,151 | 3/1981 | Coots et al. | 198/379 |
| 4,261,456 | 4/1981 | Scarpa et al. | 198/463.6 |
| 4,294,347 | 10/1981 | Furlette et al. | 198/751 |
| 4,306,646 | 12/1981 | Magni | 198/341 |
| 4,306,647 | 12/1981 | Boucherie | 198/379 |
| 4,331,228 | 5/1982 | Galarowic | 198/341 |
| 4,553,321 | 11/1985 | Zihlmann et al. | 198/341 |

FOREIGN PATENT DOCUMENTS

| | | | |
|---|---|---|---|
| 2499032 | 8/1982 | France | 198/395 |
| 59-82216 | 5/1984 | Japan | 198/394 |
| 2011336 | 7/1979 | United Kingdom | 198/399 |
| 2040852 | 9/1980 | United Kingdom | 198/399 |

Primary Examiner—Joseph E. Valenza
Assistant Examiner—D. Glenn Dayoan
Attorney, Agent, or Firm—Harry M. Weiss & Associates

[57] ABSTRACT

An apparatus and method for handling a workpiece includes the combination of a first workpiece position for checking the presence of a workpiece and a second subsequent position for checking the orientation of a workpiece. An orientation device adjacent the orientation checking position orients the workpiece to a proper position for subsequent transportation to a third workpiece position such that acceptable workpieces may be segregatably removed to a subsequent handling location.

14 Claims, 3 Drawing Figures

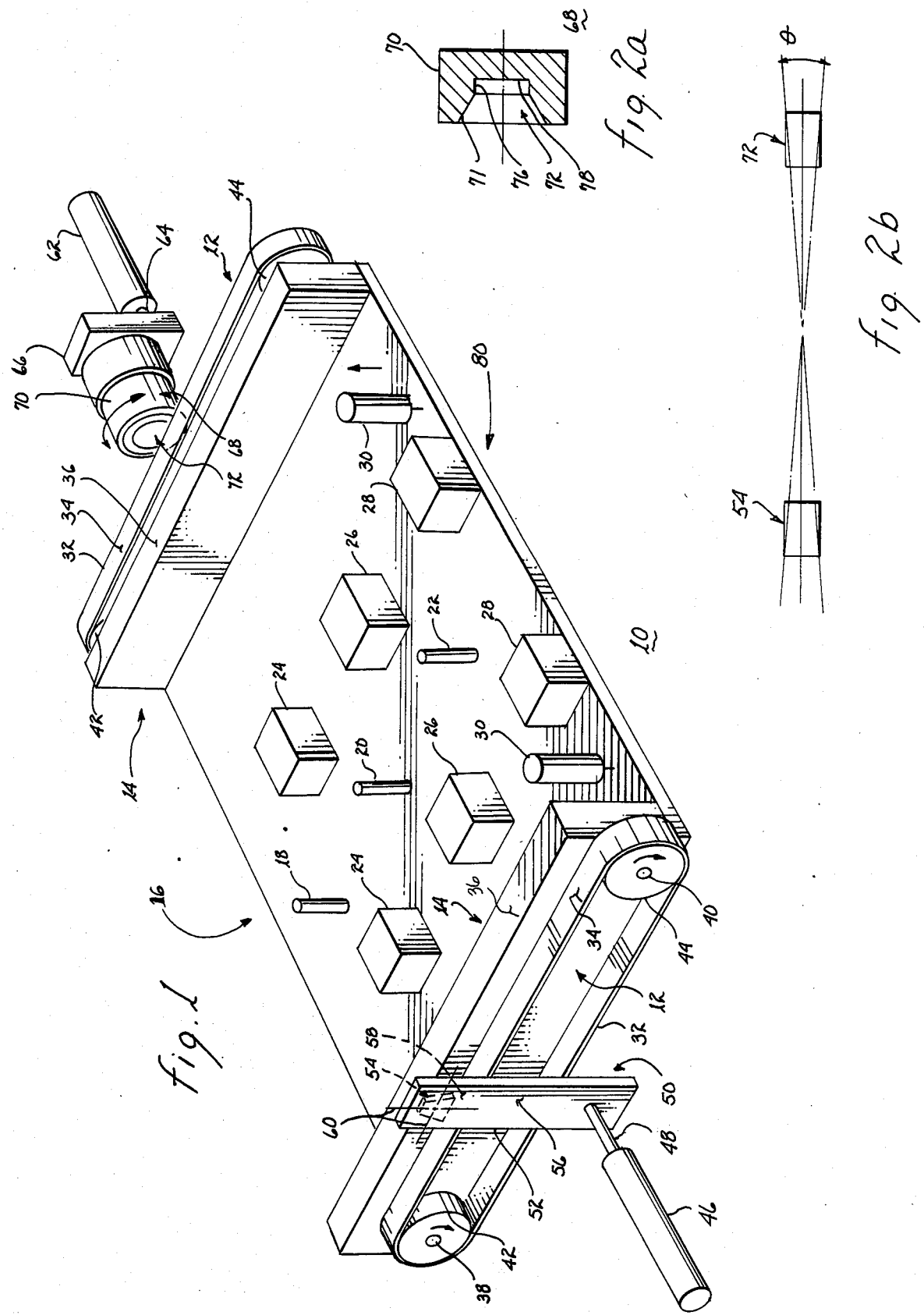

APPARATUS AND METHOD FOR HANDLING A WORKPIECE

BACKGROUND OF THE INVENTION

The present invention relates, in general, to apparati and methods for handling a workpiece. More particularly, the present invention relates to an apparatus and method of especial utility in the handling of singulated workpieces which checks for the presence of the workpiece and orients it to a desired orientation such that acceptable workpieces may be segregatably removed to a subsequent handling location.

Numerous applications exist which necessitate the removal of individual workpieces from a stockpile thereof coupled with their proper orientation and checking. Manual retrieval is, of course, one alternative but is time consuming, slow and tedious labor and a most undesirable limiting factor in the subsequent automated handling of such workpieces. Moreover, manual orientation and checking of the workpieces is similarly inconvenient.

In the automated handling of workpieces, especially those of a generally elongate shape, a large number of them are generally input into a hopper or bin such that they are aligned with their respective longitudinal axis, but may be randomly oriented as to their opposite ends and with respect to their cross-sectional periphery or aspect. While there is an advantage in initially handling these objects in bulk, they must nontheless ultimately be removed or retrieved from the stock for individual presentment to subsequent handling and testing equipment. In most instances, in order for this automated orientation and testing to be carried out, the workpieces must be similarly aligned with respect to their cross-sectional periphery as well as to the proper end presented to a given station. With the availability of an automated apparatus and method to check the presence of a workpiece and orient it to a desired orientation, acceptable workpieces may be thereafter segregatably removed to a subsequent handling location while rejected workpieces are similarly collected.

SUMMARY OF THE INVENTION

It is therefore an object of the present invention to provide an improved apparatus and method for handling a workpiece.

It is further an object of the present invention to provide an improved apparatus and method for handling a workpiece which is useful in checking the presence of a workpiece and insuring that it is oriented to a desired orientation such that acceptable workpieces may be segregatably removed to a subsequent handling location.

It is still further an object of the present invention to provide an improved apparatus and method for handling a workpiece which is economically an efficiently effectuated.

The foregoing and other objects are achieved in the present invention wherein there is provided an apparatus for handling a workpiece which includes a conveyer for transporting individual ones of a plurality of the workpieces from an input end to an output end of the apparatus. A first presence sensor determines if a first of the individual ones of the workpieces is present at a first workpiece position adjacent the input end. A first holding device in conjunction with the first workpiece position has holding and passing conditions thereof. A Second presence sensor determines if a second individual one of the workpieces is present at a second workpiece position displaced toward the output end from the input end, the second present sensor causing the first holding device to maintain the holding condition of the first individual workpiece while the second individual workpiece is present and maintain the passing condition thereof when the second individual workpiece is absent. A second holding device in conjunction with a second workpiece position has holding and passing conditions thereof. An orientation checking device adjacent the second workpiece position provides and oriented and not oriented indication thereof. An orienting device coupled to the orientation checking device rotates the workpiece about its longitudinal axis and causes the second holding means to maintain the holding condition of the second individual workpiece while a not oriented indication of the orientation checking device is received and the passing condition thereof when an oriented indication is received. Other embodiments of the apparatus in accordance with the present invention include a third presence sensor for determining if a third individual one of the workpiece is present at a third workpiece position adjacent the output end. A third holding device in conjunction with the third workpiece position has holding and passing conditions thereof. An acceptability determining device is coupled to the third presence sensor adjacent the third workpiece station for causing the third holding device to maintain the holding condition thereof whereby acceptable ones of the workpieces may be segregatably removed from the conveyer and the passing condition thereof whereby unacceptable ones of the workpieces may be alternatively removed adjacent the output end.

Also provided is a method for handling a workpiece which includes the step of transporting individual ones of a plurality of the workpieces from an input position to an output position. It is firstly determined if a first of the individual ones of the workpieces is present at a first workpiece position adjacent the input position. It is then secondly determined if a second of the individual ones of the workpieces is present at a second workpiece position displaced towards the output position from the input position. The first individual workpiece is firstly held while the second individual workpiece is present and the first individual workpiece is thereafter firstly passed when the second individual workpiece is absent. The second individual workpiece is secondly held at the second workpiece position where its orientation is checked and an oriented and not oriented indication is provided. The second individual workpiece is thereafter oriented if the not oriented indication is received and thereafter secondly passed if the oriented indiciation is received. A more specific method in accordance with the present invention includes the step of thirdly determining if a third of the individual ones of the workpieces is present at a third workpiece position adjacent the output position. The third individual workpiece is thirdly held at the third workpiece position whereby acceptable workpieces may be segregatably removed from unacceptable ones of the workpieces whereupon the unacceptable ones of the workpieces are thirdly passed to the output position.

BRIEF DESCRIPTION OF THE DRAWINGS

The foregoing and other features and objects of the present invention and the manner attaining them will become more apparent and the invention itself will be best understood by reference to the following description of an embodiment of the present invention taken in conjunction with the accompanying drawings wherein:

FIG. 1 is a simplified isometric view of a handling apparatus in accordance with the present invention showing the conveyers for transporting a workpiece from position 1 through position 3 as well as the orientation checking and orienting device of position 2;

FIG. 2a is a cut-away side plan view of the orienting device of FIG. 1; and

FIG. 2b is a simplified top plan view of the possible angles ($\theta$) for a workpiece between the sockets of the orientation checking device and orientation device.

DESCRIPTION OF A PREFERRED EMOBODIMENT

With reference to FIG. 1, a handling apparatus 10 in accordance with the present invention is shown. Handling apparatus 10 comprises, in pertinent part, conveyers 12 which serve to transport a workpiece from input end 16 to output end 80 thereof. Conveyers 12 are rotatably affixed to supports 14 as shown.

Handling apparatus 10 comprises a plurality of workpiece positions 1 through 3 as designated. The first workpiece position includes first presence sensor 18 for determining whether or not a workpiece is present at position 1. Second and third presence sensors 20 and 22 correspond to the second and third workpiece positions as illustrated. First, second and third presence sensors 18, 20 and 22 may be optical, electronic or magnetic sensors as appropriate for determining the presence of a workpiece adjacent thereto. A first pair of workpiece holders 24 is similarly disposed at the first workpiece position. First workpiece holders 24 comprise electrically activatable air cylinders for maintaining a workpiece at the first workpiece position as will be more fully described hereinafter. In like manner, second and third workpiece holders 26, 28 adjoin second and third workpiece positions respectively. The third workpiece position also includes a pair of electrically activatable accepted workpiece ejectors 30 for segregatably removing accepted workpieces from nonaccepted or rejected workpieces such the they may be removed to a subsequent handling location.

Conveyers 12 include a respective conveyer belt 32 having an upper surface 34 thereof upon which a workpiece may be transported from input end 16 to output end 80 of handling apparatus 10. Supports 14 of handling apparatus 10 also include a respective guide surface 36 for supporting a workpiece in conjunction with upper surface 34 of conveyer belt 32. Conveyer belt 32 is driven by means of drive pulley 42 in the direction shown about axis 38. Follow pulley 44 similarly revolves about axis 40.

At the second workpiece position of handling apparatus 10, and orientation checking device 50 is provided which may be forced against one end of a workpiece at the second workpiece position by activation of cylinder 46 causing piston 48 to cause orientation checking device 50 to abut one end of the workpiece. Orientation checking device 50 includes member 52 having back surface 56 and opposite front surface 58 into which is formed socket 54. Socket 54 has a shape which corresponds to the cross-sectional aspect of a workpiece and is such that the workpiece may be oriented in only one way within socket 54. In the embodiment shown, socket 54 has a generally trapezoidal cross-section Disposed within socket 54 are a plurality of sensors 60 which would provide and oriented indication when the workpiece is properly seated within socket 54 and a not oriented indication under all other circumstances.

The second workpiece position further includes orientation device 68 for engaging an opposite end of a workpiece such that it may be revolved bidirectionally about its longitudinal axis so as to properly engage socket 54 and provide an oriented indication output of sensors 60. Orientation device 68 is pressed to the opposite end of a workpiece by the activation of cylinder 62 causing piston 64 to force support 66 toward the workpiece. Orientation device 68 affixed to support 66 includes rotatable collar 70 having socket 72 formed therein such that it may engage a workpiece regardless of its orientation in accordance with its cross-sectional aspect at that position.

Referring additionally to FIG. 2a, orientation device 68 includes socket 72 having a beveled interior 74 forming a conic section. Workpiece engaging portion 76 is of sufficient physical dimensions to frictionally engage a workpiece regardless of its orientation with respect to its cross-sectional aspect. Workpiece engaging portion 76 includes end portion 78 as shown.

Referring additionally to FIG. 2b, it may be seen that a workpiece may be engaged within socket 54 of orientation checking device 50 and socket 72 of orientation device 68 throughout a range of angles therebetween defined as $\theta$. Thus, a workpiece may properly engage socket 54 of orientation checking device 50 and socket 72 of orientation device 68 even if somewhat off a right angle position to supports 14 of handling apparatus 10.

In operation, the presence of a workpiece is determined by first presence sensor 18 at the first workpiece position. If a second workpiece is not detected by second presence sensor 20, the firts workpiece holders 24 retract such that the workpiece at the first workpiece position may be transported to the second workpiece position. If a workpiece is at the second workpiece position, cylinders 46 and 62 are actuated. Orientation checking device 50 has a cavity comprising socket 54 with an outline of the cross-section or a shape of the workpiece whereby it can be inserted in one position only. Sensors 60 disposed within socket 54 provide an oriented or not oriented indication of a workpiece therein. Orientation device 68 has a socket 72 which is of sufficient physical dimensions to receive an opposite end of a workpiece in any position due to its round cavity having a conical section comprising beveled interior 74 and workpiece engaging portion 76. Its cross-section is large enough to accept the cross-section of the workpiece in whatever orientation it may be encountered. Orientation devices 68 will thereafter be rotated either continuously or discontinuously such that a workpiece will be made to properly engage socket 54 of orientation checking device 50 such that sensors 60 will give an oriented indication. After a present time, cylinders 46 and 62 will be deactuated. In the embodiment illustrated, orientation device 68 will rotate with a constant torque. As shown, the centerline of sockets 54 and 72 can either be in line or at an angle $\theta$ with respect to each other. At each of the three workpiece positions, first, second and third workpiece holders 24, 26 and 28 hold a workpiece in that position until the required detection or operation is carried out.

What has been provided therefore is an improved apparatus and method for handling a workpiece. The improved apparatus and method of the present invention checks for the presence of a workpiece and orients it to a desired orientation such that acceptable workpieces may be segregatably removed to a subsequent handling location. The apparatus and method of the present invention may be economically and efficiently affectuated.

While there have been described above principles of the present invention in conjunction with specific apparatus, it is to be clearly understood that the foregoing description is made only by way of example and not as a limitation to the scope of the invention.

What is claimed is:

1. An apparatus for handling a workpiece comprising:
   conveyer means for transporting individual ones of a plurality of said workpieces from an input end to an output end of said apparatus, said workpieces oriented in random fashion about a longitudinal axis of said workpieces, said longitudinal axis of said workpieces being substantially perpendicular to a longitudinal axis of said conveyer means;
   first presence sensing means for determining if a first of said individual ones of said workpieces is present at a first workpiece position adjacent said input end;
   first holding means in conjunction with said first workpiece position having holding and passing conditions thereof;
   second presence sensing means for determining if a second individual one of said workpiece is present at a second workpiece position displaced toward said output end from said input end, said second presence sensing means for causing said first holding means to maintain said holding condition of said first individual workpiece while said second individual workpiece is present and said passing condition thereof when said second individual workpiece is absent;
   second holding means in conjunction with said second workpiece position having holding and passing conditions thereof;
   orientation checking means adjacent said second workpiece position for providing an oriented and not oriented indication thereof, said orientation checking means comprises a socket for receiving an end of said workpiece in a singular orientation only; and
   orienting means coupled to said orientation checking means for rotating said workpiece and causing said second holding means to maintain said holding condition of said second individual workpiece while a not oriented indication of said orientation checking means is received and said passing condition thereof when an oriented indication is received.

2. The apparatus of claim 1 further comprising:
   third presence sensing means for determining if a third individual one of said workpieces is present at a third workpiece position adjacent said output end;
   third holding means in conjunction with said third workpiece position having holding and passing conditions thereof; and
   acceptability determining means coupled to said third presence sensing means adjacent said third workpiece position causing said third holding means to maintain said holding condition thereof whereby said acceptable ones of said workpieces may be segregatably removed from said conveyer means and said passing condition thereof whereby unacceptable ones of said workpieces may be alternatively removed adjacent said output end.

3. The apparatus of claim 1 wherein said conveyer means comprises generally parallel and coplanar conveyer belts.

4. The apparatus of claim 3 further comprising a guide surface in conjunction with said conveyer belts for transporting said workpieces.

5. The apparatus of claim 1 wherein said presence sensing means comprises one from a group consisting of optical devices, magnetic detectors and electronic detectors.

6. The apparatus of claim 1 wherein said holding means comprise electrically actuatable air cylinders having a piston for holding said workpiece in position.

7. The apparatus of claim 1 wherein said socket further comprises sensors disposed within said socket for providing said oriented and not oriented indications thereof.

8. The apparatus of claim 1 wherein said orienting means comprises a socket for engaging an opposite end of said workpiece and rotating said workpiece in a selected direction about a longitudinal axis thereof.

9. A method for handling a workpiece comprising the steps of:
   providing a plurality of workpieces at random orientation about a longitudinal axis of said workpieces
   transporting individual ones of said plurality of said workpieces from an input position to an output position in substantially a straight line, said longitudinal axis of said workpiece oriented substantially perpendicular to said line of transport of said workpieces;
   determining if a first of said individual ones of said workpieces is present at a first workpiece position adjacent said input position;
   determining if a second of said individual ones of said workpieces is present at a second workpiece position displaced toward said output position from said input position;
   holding said first individual workpiece while said second individual workpiece is present;
   passing said first individual workpiece while said second individual workpiece is absent;
   holding said second individual workpiece at said second workpiece position;
   checking an orientation of said second individual workpiece and providing oriented and not oriented indications thereof, said oriented and not oriented indications suitable for showing if a lateral cross-section of said individual workpiece is aligned to a selected orientation of said lateral cross-section, said step of checking is carried out by means of a socket for receiving an end of said workpiece in a singular orientation beng determined by a unique lateral cross-section of said workpiece;
   orienting said second individual workpiece if said not oriented indication is received; and
   passing said second individual workpiece if said oriented indication is received.

10. The method of claim 9 further comprising the steps of:
    determining if a third of said individual ones of said workpieces is present at a third workpiece position adjacent said output position;
    holding said third individual workpiece at said third workpiece position;

segregatably removing acceptable from unacceptable ones of said workpiece; and passing said unacceptable ones of said workpieces to said output position.

11. The method of claim 9 wherein said step of transporting is carried out by means of generally parallel and coplanar conveyer belts.

12. The method of claim 9 wherein said steps of determining are carried out by means selected from a group consisting of optical devices, magnetic detectors and electronic detectors.

13. The method of claim 9 wherein said steps of holding and passing are carried out by means of electrically actuated air cylinders having a piston for holding said workpiece.

14. The method of claim 9 wherein said step of orienting is carried out by means of a socket for engaging an opposite end of said workpiece and rotating said workpiece in one selected direction about a longitudinal axis thereof.

* * * * *